Patented Dec. 19, 1950

2,534,617

UNITED STATES PATENT OFFICE 2,534,617

LAMINATED PRODUCT

Harold W. Mohrman, Springfield, Mass., assignor to Monsanto Chemical Company, St. Louis, Mo., a corporation of Delaware No Drawing. Application January 24, 1945, Serial No. 574,443

8 Claims. (Cl. 154—43)

This invention relates to laminated glass fabric products.

Products obtained by bonding together multiple layers of glass fabric have been found to be highly advantageous for many purposes. Particularly desirable bonding agents in such laminated products are those which permit lamination under low pressures, e. g. up to 100 pounds per square inch. A particular problem has been the lack of a bonding agent which not only permits lamination at low pressures, but which produces laminated products of high strength at low laminating pressures.

One object of this invention is to provide improved laminated glass fabric products. A particular object of this invention is to provide low pressure laminated glass fabric of high strength.

These and other objects are accomplished by providing a composite of superimposed layers of glass fabric coated with a composition comprising a polymerizable compound from the group consisting of vinyl-aromatic materials, vinyl esters, and esters of acrylic and methacrylic acids, and a polyester characterized by comprising the residues of an alcohol having a terminal $CH_2=C<$ group, a glycol having 2–6 carbon atoms and a dicarboxylic acid having ethylenic unsaturation and not more than 8 carbon atoms.

The following examples are illustrative of the present invention but not limitative thereof. Where parts are given, they are parts by weight. The polyesters and glass fabrics mentioned in the examples are identified, in detail, later in the specification.

Example I

A mixture of 100 parts of Polyester "A," 30 parts of styrene and 0.65 part of benzoyl peroxide is applied to OC64 glass fabric sheets in sufficient amount so that the cured product will contain about equal amounts by weight of glass fabric and bonding agent. Prior to use the glass fabric is heated at 230° C. for 2 hours. A composite of 12 layers of the treated fabric is made up with alternate layers at right angles to each other with reference to the direction of the glass fibers. A weight sufficient to produce a pressure of about ½ pound per square inch is placed on the composite which is cured in an oven heated at 70° C. for 16 hours. The product possesses an edgewise compressive strength of about 46,000 pounds per square inch.

Example II

This example is similar to Example I, except that the glass fabric is ECC127. The product is cured by heating for 16 hours in an oven at 70° C., and has a bonding agent content of about 50% and an edgewise compressive strength of about 28,000 pounds per square inch.

Example III

Example I is repeated except that the polyester is Polyester "B." The product, after curing for 16 hours in an oven at 70° C. is found to have a bonding agent content of about 50% and to possess properties comparable to those of the product described in Example I.

Example IV

In this example a mixture of 100 parts of Polyester "C," 30 parts of styrene and 0.65 part of benzoyl peroxide is used. The composite, prepared as in Example X, is covered with cellophane and placed in a rubber bag of the type used for the so-called bag molding process. After evacuation of the rubber bag, the assembly is placed in a heated water bath for 1 hour at 55° C. and then 2 hours at 95° C. The product has a bonding agent content of about 50% and possesses an edgewise compressive strength of about 45,000 pounds per square inch.

Example V

Example IV is repeated except that the polyester is Polyester "D" and the composite is cured by being heated up to about 110° C., in a steam heated autoclave and then at this temperature for 15 minutes. The product has a bonding agent content of about 50%, and possesses an edgewise compressive strength of 45,000 pounds per square inch.

It is found that if the amount of bonding agent applied to the glass fabric in this example is reduced so that the cured product contains only about 30% bonding agent instead of about 50%, the edgewise compressive strength is reduced to about 30,000 pounds per square inch.

Products having comparable properties are obtained when the amount of styrene in the bonding composition is increased from 30 parts to 45 parts per 100 parts of the polyester.

Similar results are obtained when the benzoyl peroxide is replaced by 0.8 part of lauroyl peroxide per 100 parts of the polyester-styrene mixture.

Example VI

In this example a mixture of 100 parts of Polyester "F," 50 parts of vinyl acetate and 0.45 part of benzoyl peroxide is used. The glass fabric is pretreated by washing with an aqueous detergent solution, rinsed with water and dried. The composite is set up as in Example I and cured by heating in an oven 15 hours at 85° C., followed by 2 hours at 135° C. The product has a bonding agent content of about 45% and an edgewise compressive strength of 9,000 pounds per square inch.

*Example VII*

Example VI is repeated except that the polyester is Polyester "G" and the bonding agent contains 33 parts of styrene in place of the vinyl acetate and 0.26 part of benzoyl peroxide for every 100 parts of polyester. The composite after heating in an oven at 82° C., for 18 hours followed by 3 hours at 180° C. has a bonding agent content of about 50% and an edgewise compressive strength of 21,000.

*Example VIII*

Example VII is repeated except that the polyester is Polyester "I" and the polymerizable composition contains 45 parts of vinyl acetate and 0.3 part of benzoyl peroxide for every 100 parts of polyester. The product, after being heated in an oven at 70° C. for 24 hours, followed by 48 hours at 135° C. has a bonding agent content of about 45% and an edgewise compressive strength of 13,000.

In contrast to the results described in Example VIII, a similar product using a similar polyester in which additional diethylene glycol is used to replace the allyl alcohol possesses an edgewise compressive strength of only about 10,000 pounds per square inch. Also, the inclusion of a saturated monohydric alcohol such as butanol in place of allyl alcohol in the polyester does not produce products having the high strength of the products of the invention.

In addition to the advantage of producing products of high strength by including allyl alcohol residues in the polyesters, the products have lower viscosities than otherwise identical products free from allyl alcohol residues which have the same acid numbers.

*Example IX*

In this example a mixture of 100 parts of Polyester "D," 30 parts of 2,5-dichlorostyrene and 0.65 part of benzoyl peroxide is used. The composite is prepared as in Example I and the lamination carried out as in Example IV by covering the composite with cellophane, placing the cellophane covered composite in a rubber bag of the type used for the so-called bag molding process and after evacuation of the rubber bag curing the bonding agent by heating up the assembly to about 110° C. in a heated liquid bath and holding at this temperature for about 15 minutes. The product possesses the unexpected properties characteristic of the products of the invention and in addition possesses unusual rigidity, toughness and resistance to burning.

In place of 2,5-dichlorostyrene other chlorostyrenes may be used such as orthochlorostyrene, parachlorostyrene, 2,4-dichlorostyrene etc. as well as mixtures of two or more of these and/or other chlorostyrenes.

The glass fabric used in Examples I to IX is marketed by the Owens-Corning Fiberglas Corporation under the trade-names OC64 and ECC127. Other types of glass fabric from the same source may be used such as ECC112, ECC164 and ECC165. OC64 is a unidirectional glass fabric i. e. the glass fibers extend in the same direction. The glass fibers are held in place by cotton filler threads which comprise only about 1–2% by weight of the fabric. ECC165 is a similar fabric in which the filler fibers are glass fibers in an amount corresponding approximately to the amount of cotton fibers in OC64. Other glass fabrics may be used e. g. fabrics in which the filler threads are made from other materials such as other organic fibers, for example, silk, nylon, wool etc. or fabrics having other types of weave, such as EC112, EC127 and EC164 which are square weave fabrics of varying weights made from glass fibers. In general, the so-called unidirectional glass fabrics, i. e. fabrics in which the preponderant proportion of the glass fibers are all in the same direction and are held together by a relatively few glass, cotton or other organic fibers at right angles thereto, produce products having the highest strengths.

The edgewise compressive strength values given in the examples are obtained by A. S. T. M. Method D649–42T, except that the test specimen is 1.0 inch long and 0.2 inch square in cross section.

The commercial glass fabric used in the examples was pretreated in Examples VI–VIII by washing with an aqueous detergent solution followed by rinsing with water and drying and in the remaining examples by heating for about 2 hours at about 230° C. This treatment removes lubricants and other foreign materials from the glass fibers and may not be necessary when such materials are not present.

Usually the amount of bonding agent applied to the glass fabric is so correlated with the laminating conditions, e. g. amount of pressure, means for applying the pressure, etc., that the product will contain about equal amounts by weight of glass and bonding agent. Thus, products containing 40–60% bonding agent and 60–40% glass fabric are preferred, although good results are obtained using other proportions, e. g. 30–70% bonding agent and 70–30% glass fabric.

The laminated glass fabric products of the invention may be cured under varying pressures. Thus, for certain purposes atmospheric pressure is sufficient although generally at least about ½ pound per square inch pressure above atmospheric is desirable. On the other hand, pressures over about 75–100 pounds per square inch (gauge) may be deleterious particularly if a product is desired with a high proportion of bonding agent, due to squeezing out the bonding composition. Generally, from 15 to 20 pounds per square inch pressure (gauge) is found to be satisfactory when a product is desired in which the weight of the bonding agent is above 30% of the combined weights of glass fabric and bonding agent. Higher pressures may be used in making products having lower percentages of bonding agent. For example, 300–500 pounds per square inch pressure may be used in making products having a bonding agent content of about 20%. Pressure may be applied, when desired, in various ways, e. g., by means of weights, presses, by the vacuum bag-molding type process etc.

Various methods of molding the laminates may be used. Thus, the composite of glass fabric layers and bonding agent may be placed around or within molds of wood, rubber, metal including sheet metal, plaster, concrete etc. Due to the high degree of adhesion of the bonding agent to materials of this nature, it is desirable to cover the mold surface with cellulose acetate lacquer or sheets, cellophane or other materials which form a readily frangible bond with the cured product.

Laminates of varying thicknesses may be made by varying the number of layers of glass fabric in the composite. As pointed out above it is desirable to alternate the direction of the glass fibers when unidirectional fabrics or other fabrics varying in strength in different directions are used, in order to develop the highest strengths in the laminated product.

The polymerizable compositions of this invention are particularly suitable for use as casting resins. For example, a mixture of 100 parts of Polyester "E," 35 parts of styrene and 0.65 part of benzoyl peroxide cures on heating at 80° C. for ½ hour to a hard, tough, clear casting. Similarly, a mixture of 100 parts of the Polyester "F," 30 parts of vinyl acetate and 0.25 part of benzoyl peroxide, after curing for 60 hours at 85° C. is found to be an extremely tough, non-brittle product which may be bent double under a pressure of 12,000 pounds per square inch, without breaking. A mixture of 100 parts of Polyester "I," 30 parts of vinyl acetate and 0.4 part of benzoyl peroxide is cured in mass at room temperature for 2 days, followed by 2 days at 135° C. The resulting castings are clear and hard and cubes ½" x ½" x ½" in dimension have a compressive strength of 33,000 pounds per square inch.

The polymerized products of the invention are also highly useful in preventing passage of moisture and other vapors. For example, after 24 hours' immersion in water, slabs of the product in Example I which are 1" x 1" x ⅛" dimensions show an absorption by weight of only 0.54% and for the product in Example II an absorption of only 0.47% is obtained. When immersed in 100 octane gasoline for 24 hours, the product in Example I shows an absorption by weight of only 0.095% and the product in Example II 0.048%. In addition, the laminated glass fabrics of the invention exhibit an extremely low moisture vapor transmission, particularly when the proportion of styrene is high e. g. 35–50 parts for every 100 parts of the polyester.

When it is desirable to enhance the resistance of the products of the invention to burning, this may be done by treating the glass fabric with a flame retarding agent prior to applying the bonding agent. Expecially desirable flameproofing agents comprise products obtained by reacting phosphoric acids or the anhydrides thereof with ammonia. Particularly advantageous amido phosphates are obtained by reacting tetraphosphoric acids with ammonia. Another advantageous fire retardant material is obtained by adding phosphoric anhydride ($P_2O_5$) to an excess of anhydrous liquid ammonia, allowing the excess ammonia to evaporate and then dissolving the product in a sufficient amount of water to give the desired concentration. If the solution is excessively acid, additional ammonia may be added to reduce the acidity to the desired extent. The foregoing types of fire retardant materials may be applied to the glass fabric in any suitable manner. For example a solution of 10 parts of polyamido phosphate obtained by reacting tetraphosphoric acid with ammonia, in 90 parts of water is applied to OC64 glass fabric by passing the fabric through the solution and then between squeeze rolls to remove excess of the solution and finally drying, for example, in an oven at about 105° C.–150° C. The squeeze rolls are adjusted to produce a product containing from 10 to 15% polyamido phosphate based on the weight of the glass fabric. The treated fabric may then be coated and laminated in accordance with the present invention. The cured laminated product has a far greater resistance to the propagation of flame than a similar product in which untreated fabric is used.

In a similar manner other reaction products of ammonia and phosphoric acid or their anhydrides may be used. In general, the concentration of the amido phosphate solution and the method of application to the glass fabric are so correlated as to result in the application of 5 to 25% by weight of the amido phosphate based on the weight of the glass fabric. More particularly, the application of 10 to 15% of the amido phosphate results in greatly reducing the inflammability of the product without deleterious effects on the product.

The following examples illustrate the preparation of polyesters which may be used in the bonding agents of the invention, including the polyesters used in Examples I–IX.

*Polyester "A"*

|  | Parts |
|---|---|
| Maleic anhydride | 1470 |
| Ethylene glycol | 825 |
| Allyl alcohol | 197 |
| Para toluene sulfonic acid | 5.7 |
| Catechol | 0.22 |

All of the above ingredients, with the exception of the para toluene sulfonic acid are placed in a reaction vessel equipped with an agitator and a water-cooled distillation condenser. Carbon dioxide gas is passed through the reaction mixture throughout the reaction so that the mixture is blanketed with inert gas at all times. The mixture is heated with stirring to 165° C. and maintained at this temperature for about ½ hour. Thereafter, the paratoluene sulfonic acid is added and the heating continued at 165° C. for an additional ¾ hour. At this point, about 134 parts of water and 118 parts of allyl alcohol have distilled off. The mixture is cooled to about 125° C. and after the addition of 128 parts of allyl alcohol, heated slowly to about 190° C. over a 2 hour period and thereafter, at about 190–195° C. for an additional 4 hours. It is found that a total of about 200 parts of allyl alcohol have distilled off during the reaction. Thus, the combined allyl alcohol content is about 64% of the amount initially added. The product is a clear, resinous liquid having an acid number (milligrams of KOH per gram of resin) of about 74.

The following illustrates a polyester containing the residues of a saturated monohydric alcohol in addition to the residues of an unsaturated alcohol.

*Polyester "B"*

|  | Parts |
|---|---|
| Maleic anhydride | 2940 |
| Ethylene glycol | 1649 |
| Butanol | 252 |
| Allyl alcohol | 197 |
| Para toluene sulfonic acid | 11.4 |
| Catechol | 0.44 |

The maleic anhydride and the ethylene glycol are heated at about 190–195° C. until about 60% of the theoretical amount of water has distilled off. This requires about 1 hour. The reaction mixture is cooled to about 145° C. and the allyl alcohol, butanol, para toluene sulfonic acid and catechol added. The resulting mixture is heated to about 190° C. over a period of about 1 hour, and then at 190–205° C. until the product has an acid number of about 65. This requires about two hours additional heating.

The reaction is carried out in the same type of equipment as used in making Polyester "A," while passing carbon dioxide through the reaction mixture. About 50% of the allyl alcohol distills off during the reaction.

The following is similar to Polyester "B" except that a small excess of hydroxyl groups are present in the reaction mixture.

*Polyester "C"*

|  | Parts |
|---|---|
| Maleic anhydride | 1470 |
| Ethylene glycol | 930 |
| Butanol | 126 |
| Allyl alcohol | 98 |
| Para toluene sulfonic acid | 5.7 |
| Catechol | 0.23 |

The mixture of maleic anhydride and ethylene glycol is heated as in Example II at 165–175° C. until about 60% of the theoretical amount of water has distilled off. After cooling to about 115° C. and adding the remaining ingredients, the mixture is heated up to 185° C. over a period of about two hours and thereafter at 185–205° C. until the product has an acid number of about 32. About 50% of the allyl alcohol distills off during the reaction.

The following two polyesters illustrate the substitution of a saturated dicarboxylic acid for a portion of the maleic acid.

*Polyester "D"*

|  | Parts |
|---|---|
| Maleic anhydride | 2666 |
| Phthalic anhydride | 1140 |
| Ethylene glycol | 2170 |
| Allyl alcohol | 226 |
| Butanol | 288 |
| Para toluene sulfonic acid | 13.3 |
| Catechol | 0.6 |

The maleic anhydride, phthalic anhydride and ethylene glycol are placed in a reaction vessel equipped with an agitator and water-cooled distillation condenser, as in Polyester "B." The mixture is heated with stirring to about 190° C. and maintained at 190° C. until the acid number of the reaction mixture is reduced to about 155–165. About 45 minutes is required and at this point about 50% of the theoretical amount of water has distilled off. The reaction mixture is then cooled to about 150° C. and the allyl alcohol, butanol, toluene sulphonic acid and catechol introduced over a 15-minute period. The temperature of the reaction mixture is then raised to about 185° C. over a 2-hour period and the reaction continued until the acid number of the reaction mixture is reduced to about 30–40. This requires an additional 3 hours and during this period the temperature is gradually raised to about 205° C.

Carbon dioxide gas is passed through the reaction mixture so that the reaction mixture is blanketed with inert gas at all times. About 50% of the allyl alcohol distills off during the reaction.

The following illustrates a polyester made using equal molecular proportions of maleic anhydride and phthalic anhydride.

*Polyester "E"*

|  | Parts |
|---|---|
| Maleic anhydride | 735 |
| Phthalic anhydride | 1110 |
| Ethylene glycol | 930 |
| Butanol | 126 |
| Allyl alcohol | 98.5 |
| Para toluene sulfonic acid | 5.7 |
| Catechol | 0.23 |

The mixture of maleic anhydride, phthalic anhydride and ethylene glycol is heated as in making Polyester "B," at 175–185° C. until about 60% of the theoretical amount of water has distilled off. After cooling to about 150° C. and addition of the remaining ingredients, the mixture is heated from about 120 to 170° C. over a period of 2 hours and then at 175–185° C. until the product has an acid number of about 63. About 50% of the allyl alcohol distills off during the reaction.

In the following example the maleic anhydride and allyl alcohol are initially reacted, prior to the addition of the glycol.

*Polyester "F"*

|  | Parts |
|---|---|
| Maleic anhydride | 360 |
| Diethylene glycol | 347 |
| Allyl alcohol | 48 |

The maleic anhydride and allyl alcohol are mixed and the mixture heated under a water-cooled return condenser for about 75 minutes at 50–100° C. Thereafter the diethylene glycol is added and with the condenser set for distillation, the mixture heated at 115–230° C. until the product has an acid number of about 54. About 40% of the allyl alcohol distills off during the reaction with the diethylene glycol.

*Polyester "G"*

|  | Parts |
|---|---|
| Maleic anhydride | 588 |
| Diethylene glycol | 562 |
| Allyl alcohol | 75 |
| Para toluene sulfonic acid | 0.55 |

All of the above ingredients are mixed and the mixture reacted under the same conditions as in making Polyester "A." The temperature is raised from 120° C. to 180° C. over a period of 5 hours and then at 180–230° C. until the product has an acid number of 23. This requires an additional 6 hours. About 50% of the allyl alcohol distills off during the reaction.

*Polyester "H"*

|  | Parts |
|---|---|
| Maleic anhydride | 196 |
| Succinic acid | 236 |
| Ethylene glycol | 186 |
| Allyl alcohol | 116 |
| Para toluene sulfonic acid | 0.3 |

The above ingredients are mixed and reacted as in the case of Polyester "A" at a temperature which is gradually raised to 163° C. over a 5-hour period and then at 160–170° C. until the acid number is about 32. About 50% of the allyl alcohol distills off during the reaction.

*Polyester "I"*

|  | Parts |
|---|---|
| Maleic anhydride | 400 |
| Diethylene glycol | 400 |
| Allyl alcohol | 25 |

The above ingredients are mixed and reacted in a three-necked flask equipped with an agitator and an air condenser permitting escape of water while passing carbon dioxide through the mixture. The mixture is heated at about 160-170° C. until the product has an acid number of about 118. This requires about 6 hours. About 50% of the allyl alcohol distills off during the reaction.

Numerous variations may be introduced into the present invention as illustrated by the above examples. Thus, the reaction temperatures at which the polyester resins are prepared may be substantially varied. In place of carbon dioxide, other inert gases such as nitrogen, may be passed through the reaction mixture. In place of toluene sulfonic acid, other catalysts may be used, for example, other sulfonic acids, such as benzene sulfonic acid, sulfuric acid, metallic oxides such as litharge, calcium oxide and the like. Under certain conditions, the passage of inert gas and the use of catalyst may be omitted, although it is preferred that the reaction conditions, e. g. temperature, nature and amount of catalyst, etc., be so correlated that the product has an acid number below 125 and, for certain purposes, between 25 and 75, and such a viscosity that the mixtures with styrene have a viscosity of less than 100 poises at 25° C. (Gardner-Holdt viscosimeter) and preferably 10-40 poises at 25° C.

In place of maleic anhydride, dicarboxylic aliphatic acids generally which have ethylenic unsaturation and not over 8 carbon atoms, or the anhydrides thereof, may be used. Examples of such acids are maleic acid, fumaric acid, citraconic acid, mesaconic acid, methylethyl maleic acid, diethyl maleic acid, chlormethyl maleic acid and the like. A particularly preferred group of acids or anhydrides comprise the compounds having the general formula

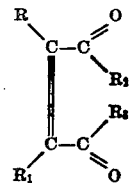

wherein R and $R_1$ are hydrogen, halogen, e. g. chlorine, bromine, etc., or alkyl groups having not over two carbon atoms and $R_2$ and $R_3$ are OH or $R_2$ and $R_3$ together stand for oxygen. When desired, mixtures of two, three or more of these acids may be used.

As examples of glycols having 2-6 carbon atoms which may be used are ethylene glycol, diethylene glycol, propylene glycols, such as, 1,2- and 1,3-propanediol, butylene glycols, such as 1,2-butanediol, 1,3-butanediol and 1,4-butanediol, triethylene glycol and the like. Especially preferred are ethylene glycol and diethylene glycol which may be represented by the formula $$HO-CH_2-(CH_2-O-CH_2)_n-CH_2OH$$

wherein $n$ is 0 or 1. When desired, mixtures of two, three or more glycols may be used.

The polymerizable bonding compositions of this invention comprise mixtures of polyesters of the type set forth herein and polymerizable vinyl compounds selected from the group consisting of vinyl aromatic compounds, vinyl esters, e. g. vinyl esters of lower aliphatic acids, and particularly vinyl esters of aliphatic acids having not over 4 carbon atoms and esters having the formula $CH_2=CRCOOR_1$ wherein R is hydrogen or $CH_3$ and $R_1$ is an alkyl group having not over 4 carbon atoms. Examples of vinyl aromatic compounds which may be used are styrene, para-methyl styrene, meta ethyl styrene, propyl styrene, ethyl methyl styrene, ortho chloro styrene, parachlorostyrene, dichlorostyrenes, for example, 2,5-dichlorostyrene, 1,2-dichlorostyrene, 2,4-dichlorostyrene, 3,4-dichlorostyrene, para-phenyl styrene, divinyl benzenes, such as paradivinyl benzene, vinyl naphthalene and the like. Examples of vinyl esters of lower aliphatic acids which may be used in the compositions of the invention include vinyl formate, vinyl acetate, vinyl propionate, vinyl butyrate, vinyl lactate, vinyl glycollate and the like. Examples of esters of acrylic and methacrylic acids include the methyl, ethyl propyl and butyl esters of these acids. Of the foregoing copolymerizable compounds the vinyl aromatic compounds are preferred and particularly vinyl derivatives of aromatic compounds having a single benzene ring.

The relative proportions of the polyesters and the polymerizable vinyl compounds may be substantially varied. However, the preferred compositions contain from 15-60 parts of styrene or other vinyl compound for every 100 parts of the polyester and, especially, from 25-50 parts for every 100 parts of polyester. While other proportions may be used, when less than 15 parts of styrene or other vinyl compound is employed, the copolymer tends to be rubbery and to lack strength, whereas proportions higher than 50 parts per 100 of the polyester tend to result in unstable products in that the mixtures separate into two layers on standing and have other deleterious effects, such as excess shrinkage on curing, etc.

A particularly preferred class of bonding agents comprises compositions in which the polyester is made from a mixture of an unsaturated dicarboxylic acid and a saturated dicarboxylic acid. Such bonding agents are characterized by an exceptional stability over long periods of time in that there is no crystallization of the polyester from the polymerizable composition. In general, the molecular ratio of saturated acid to unsaturated acid does not exceed 60:40. A molecular ratio of saturated acid to unsaturated acid of at least 10:90 is found to be desirable in producing stable compositions. Ratios of saturated acid to unsaturated acid between 25:75 and 50:50 result in polyesters which when mixed with styrene or other vinyl compounds result in compositions having not only unusual resistance to crystallization, but substantially retain other advantageous characteristics of the bonding agents of the invention.

As examples of saturated dicarboxylic acids may be mentioned succinic acid, adipic acid, phthalic acid and like acids having from 4 to 8 carbon atoms. Compositions having phthalic acid as the saturated acid component of the polyester are especially preferred since the laminated products made with such compositions are found to have an unusual hardness and durability.

In place of allyl alcohol, there may be used other allyl type alcohols having from 3 to 10 carbon atoms, such as methallyl alcohol, methyl vinyl carbinol, allyl carbinol, beta-allyl ethyl alcohol, monoallyl and monomethallyl ethers of ethylene glycol and the like. The amount of allyl alcohol reacted with the acid components may vary between 1 and 10% based on the total number of possible ester linkages. An excess of allyl alcohol may be used with the excess being removed by distillation during the course of the reaction.

In place of 1-butanol used in polyesters "B"

and "C," other saturated lower aliphatic alcohols having straight or branched chains may be used, particularly alcohols having 3–6 carbon atoms, such as propanol, 1-pentanol, 2-methyl - 1 - butanol, 2 - pentanol, 2 - methyl - 2-butanol, 2-propanol, 2-butanol, 2-methyl-2-propanol and the like. The amount of saturated alcohol may be substantially varied, but polyesters in which 1–10% of the ester linkages are made with saturated monohydric alcohols, form a preferred class. Glass fabric bonded with polyesters of this type are especially desirable in that the corrosive action of such products on materials in contact therewith such as copper, iron and other metals is substantially reduced without increasing the polymerization rate of the bonding agents.

Instead of introducing an excess of the allyl-type alcohol into the reaction mixture, as in certain of the examples, substantially the amount desired to be reacted may be used and any that is distilled off returned to the reaction mixture. In this case it is desirable to add to the reaction mixture a suitable organic solvent which is preferably substantially insoluble in water, but which dissolves the reactants and the resulting polyester resin. In addition, it is desirable to provide a suitable trap for separating and removing the water formed during esterification, together with means for returning the essentially non-aqueous fraction of the distillate to the reaction chamber after condensation. Examples of suitable solvents are benzene, toluene, xylene, ethylene dichloride, carbon tetrachloride, cresols and the like. Following the completion of the reaction as evidenced by a sufficiently reduced acid number, the volatile ingredients are distilled off, preferably under reduced pressure, e. g., 1–10 mm. mercury absolute pressure.

In preparing the polyesters the components are usually so proportioned that there are present in the reaction mixture approximately equivalent amounts of hydroxyl and carboxyl groups. However, as illustrated by Example VIII most of the advantageous characteristics of the products of this invention are retained when there is a small excess of acidic groups. On the other hand, when it is desirable, for example, to keep the corrosive action of the products at a minimum without substantially affecting the advantageous characteristics of the products and particularly when the reaction is carried out under such conditions that there is a loss of a portion of the hydroxyl containing components, it is desirable to have present a small excess of glycol, e. g. 5–10%, as illustrated by the examples using Polyesters "C," "D," and "E."

Generally, it is preferred not to use polyesters containing reactants other than those given hereinbefore. However, when it is desired to impart certain variations in properties to the products of the invention, small amounts e. g. 5–15% of various modifiers which have been previously used in alkyd resins may be incorporated with the polyesters. Among these are the ordinary monobasic acids, particularly acids having from 10–20 carbon atoms. These may be mixed fatty acids derived from vegetable oils or the individual acids present therein. When desired, the vegetable oils themselves may be incorporated by conventional methods, e. g., by the so-called "alcoholysis" method. As examples of vegetable oils may be mentioned linseed oil, perilla oil, soybean oil, castor oil, dehydrated castor oil, palm kernel oil, coconut oil and the like.

In order to accelerate the polymerization reaction, polymerization catalysts may be incorporated in the bonding agents of the invention. Particularly preferred are organic peroxides such as benzoyl peroxide, succinic peroxide, and especially peroxides made from fatty acids having from 10–20 carbon atoms, such as lauroyl peroxide, stearoyl peroxide, and the peroxides made from vegetable oil acids, such as cocoanut oil acid peroxides. Alcohol peroxides, e. g. tertiary butyl hydroperoxide and terpene oxides, e. g. ascaridole, may also be used. Usually only small amounts of polymerization catalysts are used, e. g. from about 0.1% to about 2% of the bonding agent by weight.

When the bonding agents are to be stored for considerable periods of time, it is desirable to include an inhibitor. Examples of suitable inhibitors are guaiacol, paraquinone, para tertiary butyl catechol, hydroquinone, ortho dinitro phenols, ortho trinitro phenols and the like. Usually from 0.2 to 1% based on the weight of the bonding agent is sufficient to inhibit the polymerization for substantial periods of time.

As illustrated by certain of the above examples, it is frequently desirable to include an inhibitor for the "addition-type" reaction such as catechol, in making the polyester. The inclusion of such an inhibitor permits the esterification reaction to go substantially to completion without undue viscosity increase as a result of combination through reaction of the polyester chains at the double bonds. Other inhibitors may be used such as hydroquinone, guaiacol and the like.

The polymerizable compositions of this invention have a wide variety of uses, e. g. in coating compositions, casting compositions, molding compositions and the like. Thus, these compositions may be polymerized in mass to form infusible, insoluble castings or they may be used in coating and/or impregnating various materials such as textiles, paper, wood, metals and the like, followed by polymerization in situ. They may be admixed with fillers such as wood flour, cellulosic fibers, mica, rag stock, chlorinated diphenyls, clay, glass wool, asbestos and the like, and the resulting compositions molded under heat and pressure to form valuable molded products. They may be used in the production of laminated paper or cloth materials which may be used for electrical insulation, abrasive wheels or disks, gears, brake linings and the like. A particularly valuable application is their use as potting compounds or other uses where their ability to be cast around electrical parts and then cured is advantageous. Other valuable uses include their use in coating receptacles such as beverage and food containers and for treating cloth or paper to render the same resistant to moisture or chemical action, as for example, in forming shower curtains, raincoats, as optical cements, bonding agents for laminated glass and the like.

The ability of composites such as multiple layers of glass fabric coated with the bonding agents of the invention to be cured to the insoluble, infusible state at low pressures, makes possible the preparation of laminated products of large size and varying shape such as table tops, wall panels, cabinets, such as radio cabinets, food cabinets, bath tubs, business machine housings, wagon bodies, truck bodies, suitcase, trunk and other luggage receptacles, cockpit housings and other aircraft parts, fenders, trunks and other automobile parts, crates, returnable drums, boxes and other packaging containers. These and other articles may be made with varying degrees of transparency and color shades by the addition of pigments and/or dyestuffs.

Composites in which the glass fabric is replaced by other base materials such as fabrics made from natural and/or synthetic fibers may be used, e. g. wool, cotton, silk, rayon, nylon etc. may be used. Other porous base materials include wood and paper.

The polymerizable compositions of this invention may be polymerized at a wide variety of temperatures. Thus, polymerization may be carried out at room temperatures, particularly when substantial amounts of catalysts are present, e. g. 5% or above. Generally, where possible, it is desirable to employ higher temperatures in order to shorten the time required for polymerization, e. g. temperatures between 50° C. and 200° C. For many applications, temperatures between about 70° C. and 125° C. are found most advantageous. In curing thin films it is frequently desirable to carry out the operation in the presence of an inert atmosphere since the pressence of oxygen tends to retard the cure. On the other hand, when thick layers of the polymerizable compositions are to be cured, it may be desirable to carry out the polymerization in the presence of air or oxygen, since by operating in this manner the compositions harden from the inside out due to the inhibitory action of oxygen on exposed surfaces.

It is to be understood that the description of this invention is illustrative thereof and that variations may be made within the scope of the invention as defined in the appended claims.

What is claimed is:

1. Laminated unidirectional glass fabric containing as a bonding agent a heat cured composition comprising a vinyl aromatic compound selected from the group consisting of styrene, ring-substituted alkyl styrenes, ring-substituted chlorostyrenes, vinyl naphthalene and divinyl benzene, and a polyester characterized by comprising the residues of an aliphatic monohydric alcohol having a terminal methylene group and containing 3-10 carbon atoms, the number of said residues constituting from 1-10% of the total ester linkages, a glycol having from 2-6 carbon atoms and a dicarboxylic acid having ethylenic unsaturation and not over 8 carbon atoms, the amount of the vinyl aromatic compound being from 15-50 parts per 100 parts of the polyester.

2. A product as defined in claim 1 in which the unsaturated dicarboxylic acid has the general formula:

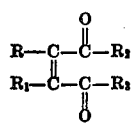

wherein R and R1 are hydrogen, halogen or alkyl groups having not over 2 carbon atoms, and R2 and R3 are OH or R2 and R3 together stand for oxygen, and the unsaturated alcohol residues are residues of allyl alcohol.

3. A product as defined in claim 1 wherein the unsaturated acid is maleic acid and the unsaturated alcohol residues are residues of allyl alcohol.

4. A product as defined in claim 1 wherein the vinyl aromatic compound is styrene.

5. A product as defined in claim 4 wherein the unsaturated acid is maleic acid.

6. Laminated unidirectional glass fabric, the bonding agent of which comprises a heat cured composition comprising styrene and a polyester characterized by comprising the residues of allyl alcohol equivalent to 1-10% of the total ester linkages, ethylene glycol and a dicarboxylic acid having the general formula:

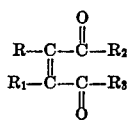

wherein R and R1 are hydrogen, halogen or alkyl groups having not over two carbon atoms and R2 and R3 are OH or R2 and R3 together stand for oxygen, the amount of styrene being from 15-50 parts per 100 parts of the polyester.

7. A product as defined in claim 6 in which the dicarboxylic acid is maleic acid.

8. Laminated unidirectional glass fabric, the bonding agent of which comprises a heat cured composition comprising a vinyl aromatic compound selected from the group consisting of styrene, ring-substituted alkyl styrenes, ring-substituted chlorostyrenes, vinyl naphthalene and divinyl benzene, and a polyester characterized by comprising from 1-10%, based on the total ester linkages, of residues of an aliphatic monohydric alcohol having a terminal methylene group and containing 3-10 carbon atoms, a glycol having from 2-6 carbon atoms, a dicarboxylic acid having ethylenic unsaturation and not over 8 carbon atoms and a saturated dicarboxylic acid having from 4-8 carbon atoms, from 10-60% of the dicarboxylic acid residues being saturated acid residues, the amount of the vinyl aromatic compound being from 15-50 parts per 100 parts of the polyester.

HAROLD W. MOHRMAN.

REFERENCES CITED

The following references are of record in the file of this patent:

UNITED STATES PATENTS

| Number | Name | Date |
|---|---|---|
| 1,921,756 | Kienle | Aug. 8, 1933 |
| 2,255,313 | Ellis | Sept. 9, 1941 |
| 2,280,242 | Kropa | Apr. 21, 1942 |
| 2,314,701 | Harvey | Mar. 23, 1943 |
| 2,339,058 | D'Alelio | Jan. 11, 1944 |
| 2,369,689 | Robie | Feb. 20, 1945 |
| 2,370,565 | Muskat et al | Feb. 27, 1945 |
| 2,407,479 | D'Alelio | Sept. 10, 1946 |
| 2,409,633 | Kropa | Oct. 22, 1946 |
| 2,414,125 | Rheinfrank | Jan. 4, 1947 |
| 2,429,688 | Hoover | Oct. 28, 1947 |

FOREIGN PATENTS

| Number | Country | Date |
|---|---|---|
| 540,168 | Great Britain | Oct. 8, 1941 |
| 540,169 | Great Britain | Oct. 8, 1941 |
| 119,274 | Australia | Dec. 7, 1944 |

OTHER REFERENCES

Plastics Bulletin No. 2, Pittsburgh Plate Glass Co., Aug. 10, 1942.